Feb. 23, 1971   H. N. HICKS, JR   3,565,968
CRACKING AND RECOVERY OF HYDROCARBONS
Filed July 31, 1967   4 Sheets-Sheet 1

INVENTOR
Harold N. Hicks, Jr.

BY *Walter H. Schneider*

ATTORNEY

Feb. 23, 1971     H. N. HICKS, JR     3,565,968
CRACKING AND RECOVERY OF HYDROCARBONS
Filed July 31, 1967     4 Sheets-Sheet 2

INVENTOR
Harold N. Hicks, Jr.

BY Walter H. Schneider
ATTORNEY

Feb. 23, 1971    H. N. HICKS, JR    3,565,968
CRACKING AND RECOVERY OF HYDROCARBONS
Filed July 31, 1967    4 Sheets-Sheet 4

INVENTOR
Harold N. Hicks, Jr.
BY Walter H. Schneider
ATTORNEY

United States Patent Office 3,565,968
Patented Feb. 23, 1971

3,565,968
CRACKING AND RECOVERY OF HYDROCARBONS
Harold N. Hicks, Jr., Huntington, W. Va., assignor to Ashland Oil & Refining Company, Houston, Tex., a corporation of Kentucky
Filed July 31, 1967, Ser. No. 657,342
Int. Cl. C07c 3/30
U.S. Cl. 260—683                                37 Claims

ABSTRACT OF THE DISCLOSURE

This application discloses methods and apparatus for cracking hydrocarbon feedstocks, in which a solid carbonaceous fuel is burned within a cracking zone to supply the temperature and the heat required for the endothermic cracking reaction. A reactor is also disclosed which has in it an eductor tube that is of reduced cross-sectional area with respect to the cracking chamber for preferentially recovering from the interior of the reactor a stream rich in cracked products and lean in combustion products and ash.

BACKGROUND OF THE INVENTION

The broad field of the invention is the cracking of hydrocarbons. Mor particularly the invention relates to the production of unsaturated hydrocarbon products by cracking hydrocarbon feedstocks having a higher degree of saturation than the unsaturated hydrocarbon products produced therefrom. In one specific aspect, the invention pertains to the production of acetylene and ethylene mixtures.

Despite the fact that the patent art and literature are replete with a wide variety of different processes and apparatus for carrying out the cracking (pyrolysis) of hydrocarbon feedstocks (e.g., to acetylene and/or ethylene), only a relatively few of the suggested processes and apparatus have achieved significant commercial status. Among the various types of processes which have attained some degree of commercial importance are: arc processes, in which the hydrocarbon feedstock is heated to its pyrolysis or cracking temperature by passing an electric discharge therethrough; the "Wulff Process," in which a regenerative reactor comprising a heat absorption-desorption mass (e.g., refractory brick checkerwork) is alternately (a) heated by hot combustion gases and (b) used to heat feedstock to its cracking temperature by direct heat exchange; and partial combustion processes in which feedstock is fed to a reactor along with only enough oxygen to burn part of the feedstock, and the resultant heat is used to convert the remainder of the feedstock to cracked products.

In addition to the types of processes just described, the prior art suggests many other processes and apparatus which, though theoretically operable, nevertheless suffer from various practical disadvantages which render them either uneconomical or exceedingly difficult to control and operate consistently. Among the various considerations which have discouraged the commercial utilization of such other known processes are high general operation and maintenance costs which are peculiar to the various processes, high energy costs and high feedstock costs. Some of these same disadvantages also apply to those processes which have come into commercial use.

Factors which contribute to the general operating and maintenance costs of a given process include: the rate of throughput which is feasible for the process and its associated equipment, the concentration of the desired products, and the type and concentration of undesired products, which factors determine the amount of investment needed for a plant of given production capacity; any special procedures involving the exercise of unusually close operating control, which may result in high labor costs and occasional malfunctions; and any requirements for circulating materials other than feed and fuel through the process, thus necessitating the provision of apparatus for introducing and/or removing such additional materials. The last-mentioned factor will be discussed in further detail hereinafter.

As indicated previously, high energy costs are an undesirable feature of some of the known processes. "Energy cost" refers to the actual cost of energy in the production of a unit weight or volume of product. Such factors as the type of energy source employed and the thermal efficiency of the process and apparatus enter into the overall energy costs. For instance, in a process in which the heat is supplied in the form of electrical energy which heats the feed directly, e.g. by electrical discharge, or indirectly, e.g., by heating resistance coils which contact the outer surface of the cracking chamber, energy costs will be quite high. The electricity used in such process may, for instance, be obtained from an electrical generating plant which burns coal, and the electrical power generating plant may recover only about 40% of the heat energy available from the coal. In certain other processes, thermal efficiency is a critical factor. For instance, in some of the precombustion processes which have been suggested, in which a hot gaseous medium is formed by combustion in one chamber and is then transferred to another chamber where it is mixed with the cracking stock to heat the stock to cracking temperature by direct heat exchange therewith, heat losses due to conduction, radiation, etc. tend to be rather substantial, thus resulting in a lower thermal efficiency and requiring the utilization of more fuel per unit product produced, with consequent greater expense than would otherwise be necessary.

As suggested above, high feedstock costs detract from the attractiveness of some of the known processes. In this connection, it should be understood that where a given process requires a special type of feedstock which is more expensive than the feedstocks generally employed in other cracking processes, the process in question will be at an economic disadvantage in this respect. Feed costs are also affected by yield considerations. Yield, the percentage of the feedstock which is actually converted to the desired product in recoverable form as compared to the amount that is theoretically convertible, will be adversely affected where the process in question tends to encourage competing reactions (e.g., combustion of the feed, water gas reaction and so forth) or where the process or apparatus is incapable of subjecting the feedstock to the correct time/temperature history. The concept of "time/temperature history," its importance, and certain complicating factors involved in attaining same will now be discussed by reference to the accompanying drawings.

BRIEF DESCRIPTION OF THE DRAWINGS

In the drawings which accompany this specification, in which uniform reference numerals are employed to identify the same parts when they appear in more than one view, and in which the various parts are not to scale.

Time/temperature history discussion

The concept of time/temperature history is applicable to virtually any process for the cracking of hydrocarbons. However, for puroposes of simplified explanation, it will be discussed in connection with a prior art precombustion process for producing acetylene and ethylene. Precombustion processes differ somewhat from partial combustion processes. In the latter, part of the feedstock is burned in the same chamber in which cracking takes place. In the usual precombustion process, combustion and cracking take place in separate chambers, so that the feedstock which is to be cracked does not come under the influence of the flames from the combustion.

Figure 1:
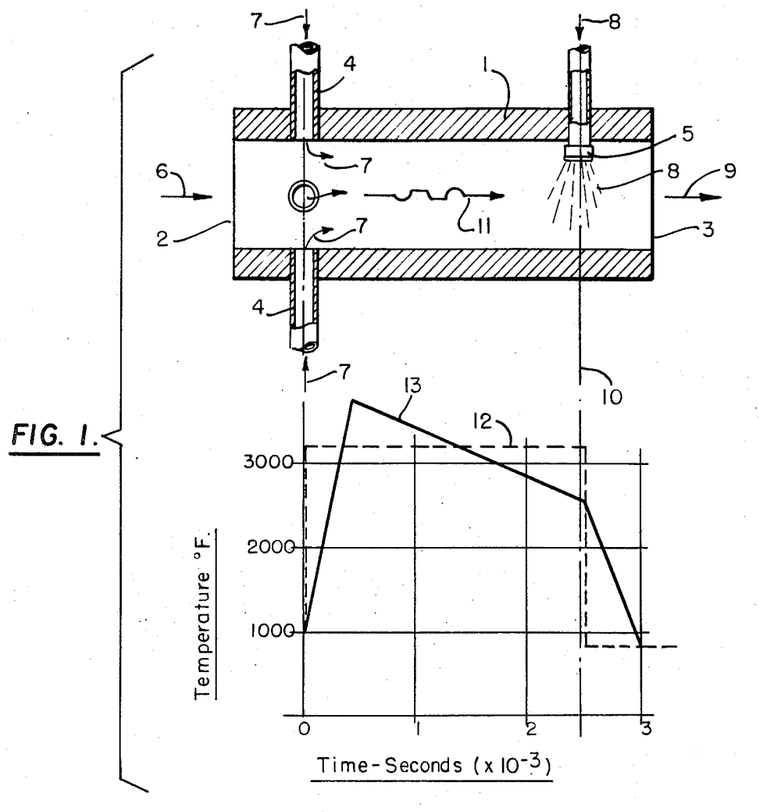
FIG. 1 is a schematic diagram of a precombustion type pyrolysis reactor linked with a graph illustrating the hypothetical temperature and residence time of the flow of a selected feedstock and products which might pass through such apparatus.

In the precombustion type reactor shown in FIG. 1, which has been greatly simplified for purposes of illustration, the reactor comprises a tubular chamber 1 having an inlet end 2 and an outlet end 3. Downstream a short distance from inlet end 2 are a plurality of identical feedstock inlets 4, which communicate with the interior of chamber 1. A short distance upstream from outlet end 3 is a quench nozzle 5 and supply pipe, which also communicate with the interior of chamber 1.

The flows of materials into, through and out of the above-described reactor are represented by a number of arrows. Arrow 6 represents a flow of hot gaseous heating medium (e.g. inert combustion gases at a temperature of say 4000° F.) which enter inlet end 2. The gaseous heating medium is prepared in a combustion chamber (not shown) which is entirely separate from chamber 1, but which communicates therewith through inlet 2. Arrows 7 represent gaseous hydrocarbon feedstock (e.g. propane, preheated to 900° F.) which enters through inlet 4 and promptly mixes with and is heated by the gaseous heating medium 6. The feedstock is preheated in a preheater (not shown) which is also separate from cracking chamber 1. As the reaction mass 11 (the resultant hot mixture of gaseous heating medium 6 and feedstock 4) forms, the continuous introduction of additional gaseous heating medium and feedstock pushes the reaction mass downstream in chamber 1 towards the quench nozzle 5, and the heated feedstock therein cracks to acetylene and ethylene. Upon arrival at the quench nozzle the reaction mass 11 promptly mixes with a flow of relatively cool quench fluid (e.g. water, hydrocarbon, or other suitable coolant), represented by arrows 8, and is cooled thereby to a temperature so low that cracking is substantially completely terminated. The mixture of quench fluid, reaction products and by-products, represented by arrow 9, departs the reactor through outlet end 3.

FIG. 1 includes a graph in which the horizontal axis is a time axis, positioned so that its left end lies directly below the feedstock inlets 4, and its right end lies directly below outlet end 3 of cracking chamber 1. The time axis is marked off in thousandths of seconds (seconds $\times 10^{-3}$), the left end of the time axis being arbitrarily labeled "0" seconds to represent the instant when a selected portion of the reaction mass begins its journey from the vicinity of the feedstock inlets to the vicinity of the quench nozzle 5. A reference line 10 extends from the centerline of quench nozzle 5 to the time axis of the graph to show that time during the travel of the reaction mass when it is cooled by the quench fluid. The vertical axis of the graph is marked off in degrees Fahrenheit to show the temperature prevailing within the selected portion of reaction mass at different times as it journeys through the chamber. Under steady state conditions (e.g., when the flow rates, the composition and the injection temperatures of the feedstock, the gaseous heating medium, and the quench fluid and the temperature of the surroundings are all holding constant) every cubic inch of the reaction mass which forms near inlets 4 and travels along the axis of chamber 1 past quench nozzle 5 will heat up and cool off on the same time schedule as succeeding cubic centimeters of the reaction mass. The relationship which exists between the temperatures of the feedstock, reaction mass and products at various stages of the reaction and the sequence and time intervals in which the materials are subjected to such temperatures is referred to as the time/temperature history of the process, which history is most conveniently represented in graphical form, as illustrated in FIG. 1.

The importance of subjecting the hydrocarbon feedstock to a proper time/temperature history results from the fact that within the broad range of temperatures which will induce some pyrolysis of hydrocarbons there are certain temperatures which favor the production of acetylene, still other temperatures (generally lower) which favor the production of ethylene, and still other temperatures (both higher and lower) which favor the production of still other products such as di-acetylene, carbon black, and tar, which may or may not be desired. Thus, there is an optimum cracking temperature to which one must subject the feedstock in order to recover a particular desired product or product mixture. Generally speaking, the invention yields particular advantages in the production of mixtures of acetylene and ethylene, and the relative ratios of acetylene and ethylene in the product mixture may be influenced somewhat by the temperature to which the feedstock, as well as the resultant products, are subjected. To the extent that the optimum operating temperature corresponding to a particular desired mixture of products is not uniformly maintained during the cracking reaction, varying quantities of unwanted products will be produced, thus downgrading some feedstock. Also, as will be appreciated by those skilled in the art, the subjection of the feed to a proper time/temperature history is an essential factor in achieving high percentages of conversion of the feed in a single pass, e.g. without recycling. Accordingly, in order to obtain the desired product mixture, attempts should be made: (a) to reduce insofar as possible the period of time required to heat the feed to the optimum temperature; (b) to maintain the temperature of the reactants as nearly constant as possible at the opimum temperature while the cracking reaction is taking place; and (c) to reduce insofar as possible the length of time required to cool the reaction mixture upon completion of the reaction. To the extent that these objectives are realized, the total period of time during which the feed hydrocarbon will be subjected to temperatures which produce unwanted products will be curtailed, and a proper time/temperature history will thereby be attained, leading to the desired mixture of products (e.g. acetylene-ethylene) in the product stream.

A hypothetical idealized time/temperature history for production of an acetylene-ethylene mixture rich in acetylene may be illustrated by reference to the dashed line 12 in the graph of FIG. 1. Line 12 has its origin of a time of "0" and a temperature of slightly less than 1200° F., which represents a desirable upper limit for the preheating of some cracking stocks. The hypothetical reaction mass and a selected hypothetical feedstock are heated instantaneously to the desired cracking temperature, e.g. 3150° F. Thus, without being subjected to intermediate temperatures for any appreciable time, the feedstock temperature goes from below 1200° F. to 3150° F. The temperature of the feed is then held at precisely 3150° F. until 2.5 thousandths ($2.5 \times 10^{-3}$) seconds have passed, at the end of which time the temperature of the reaction mass and included products are instantaneously lowered to about 800° F., a temperature at which further reaction of the products is not to be expected.

The time/temperature history depicted by dashed line 12, though desirable, is unrealistic for a number of reasons. First of all, no method is known of either instantaneously heating or cooling the reaction mass. Thus, the step of heating and cooling the reaction mass must occupy an appreciable time period, during which periods the feed and at least some of the products are at temperatures other than the optimum cracking temperature, thus encouraging undesired reactions and reducing yield. Secondly, hydrocarbon cracking processes of the type described are highly endothermic on nature. That is, each molecule of feedstock which cracks in the reaction zone absorbs an amount of heat energy from the reaction mass. The heat energy absorbed by all the cracking molecules, considered in the aggregate, constitutes a substantial withdrawal of heat from the reaction mass during the reaction. Applying this fact to the usual precombustion process, in which the feedstock is heated solely by admixing it at the beginning of the reaction with precombusted gases, it will be apparent that as any selected portion of the reaction mass moves downstream from the point of mixing and as the reaction continues, the temperature of the reaction mass will drop as molecules of feedstock are cracked. If the charging temperatures and flow rates of the gaseous heating medium and feedstock are adjusted to impart the optimum cracking temperature to the reaction mass at the beginning of the reaction period, the temperaure will fall to well below optimum towards the end of the reaction period, thus encouraging undesired side reactions and reduced yield during that interval. The foregoing statement assumes that the reactor is operated at high (economically realistic) feedstock to oxidant plus fuel ratios, which is of course a desirable condition. A third reason is that the temperature of the reaction mass will tend to fall during the reaction for other reasons. There are inevitable losses of heat to the atmosphere from any production size cracking unit, and such losses of heat cool the reaction mass, lowering its temperature as it progresses through the reactor. Thus, in order to keep the average temperature of the reaction mass at the optimum level in a precombustion reactor of the type discussed above, it is necessary to adjust the charging temperatures and flow rates of the gaseous heating medium and feedstock so that the reaction mass will initially attain a temperature significantly above optimum and, towards the end of the reaction period, will fall to a temperature well below optimum, as suggested by solid line 13 in the graph. This, however, as plainly shown in the graph, results in subjecting the feed and products to temperatures significantly above and below the optimum cracking temperature during a substantial portion of their period of reaction, thus encouraging unwanted side reactions and diminishing both the yield and thermal efficiency of the process.

Certain known processes suggest partial solutions to certain of the above problems. For instance, it has been proposed that the temperature within the reaction zone of a precombustion or partial combustion type cracking apparatus be stabilized by diluting the reaction mass with steam. However, temperature stabilization is achieved in this manner at the expense of thermal efficiency and yield of high value products.

It has also been proposed to stabilize the temperature within the reaction zone of a precombustion type cracking reactor by vaporizing certain temperature-stabilizing substances in the combustion zone so that they become part of the reaction mass and travel through the reaction zone along with the hot combustion gases and feedstock. Various metal oxides and salts have been proposed as temperature stabilizing substances. The vaporization of these substances extracts heat from the hot combustion gases in the combustion zone and stores such heat as latent heat of vaporization. When the feedstock is subsequently added to the mixture of hot combustion gases and vaporized metallic salt or oxide, the endothermic reaction abstracts energy from the flame product-vapor mixture and the vapors condense, yielding the stored latent heat as sensible heat to replace the abstracted heat and thus stabilizing the temperature within the reaction zone. While such process does assist in the maintenance of stable temperature conditions within the reaction zone, it also requires the circulation of an extraneous material (a material other than fuel and feedstock) through the system, requiring additional equipment such as heaters, reservoirs, circulating pumps and devices for the temperature stabilizing additives.

Still another proposal for stabilizing temperatures within the reaction zone of a cracking reactor is to provide an electrical heating element extending longitudinally through the cracking chamber from one end thereof to the other. The electrical heating element adds heat to the reaction mass throughout the length of the reaction zone, thus tending to make up for the heat abstracted by the endothermic cracking reaction and thereby exerting a stabilizing tendency upon the temperature of the reaction mass. However, in such reactors, heat is transferred to the feedstock through a wall of the cracking chamber, and the heat transfer rates of acceptable refractory materials are so slow as to inevitably produce an undesirably poor time-temperature history in production size equipment. Accordingly, this proposal, though of considerable experimental and theoretical interest from the standpoint of demonstrating the high yields of product that can be obtained under reasonably stable reaction temperature condition, suffers from the disadvantage of becoming inefficient when scaled up. Accordingly, it is evident that the art would be benefited by the development of a cracking process which is capable of subjecting a feedstock and the resultant products to a near ideal time/temperature history without the losses in thermal efficiency, the complications and costs of circulating extraneous materials through the reactor and the high energy costs which are experienced with the steam dilution, circulation of volatile salts and retains the foregoing advantages even when scaled up for commercial operations.

There is a definite need for improvements in the efficiency of processes and apparatus for cracking hydrocarbons to acetylene and mixtures of acetylene with ethylene, since the growth rate for industrial utilization of ethylene is currently higher than that of acetylene, this trend being due in no small part to the fact that certain chemicals formerly based on acetylene are now being made from ethylene in view of significant reductions which have been realized in the cost of production of the latter material. It is believed, therefore, that there is a need for improvements in the efficiency of producing acetylene if acetylene is to maintain or improve its position as a raw material.

OBJECTS

It is an object of the present invention to fulfill the above-mentioned need. Another object is to provide an apparatus and process for subjecting a hydrocarbon cracking stock to a time/temperature history which discourages yield losses from unwanted side reactions. Yet another object is to provide processes and apparatus for cracking hydrocarbons to acetylene-ethylene mixtures at a low energy cost per pound of product. Still another object is to provide processes and apparatus for cracking hydrocarbons in which the thermal energy required for the endothermic cracking reaction is transferred to the reaction mass in an extremely rapid manner. Another object is to provide a cracking process in which the cracking stock is heated to a very substantial extent by high emissivity, incandescent particles of carbonaceous fuel. Yet another object is to provide processes and apparatus for conducting a cracking reaction with a very high level of thermal efficiency. Still another object of the invention is to provide processes and apparatus for conducting a cracking reaction to produce the desired cracked products at high levels of concentration, thus facilitating their recovery. Yet another object of the invention is to provide processes and apparatus for conducting a cracking reaction while minimizing formation and adherence of undesired deposits in the cracking apparatus. Another object is to provide a cracking process employing a solid carbonaceous fuel as the heat source and in which the fuel is burned in the same chamber in which the cracking reaction takes place, but in which the feedstock and burning fuel are maintained substantially separate from one another. These and other objects of the invention will become apparent to those skilled in the art upon consideration of the following description of the invention and certain preferred embodiments thereof.

SUMMARY STATEMENT ON THE FEATURES OF THE INVENTION

The foregoing objects are attained in a process which includes a combination of features. Some features, constituting a part of the overall process described below, may be used separately from the other features. Nevertheless, the objects of the invention are most readily obtained when all of the features are used in combination. In accordance with the overall process described herein, a gaseous hydrocarbon cracking stock, a particulate carbonaceous fuel and a gaseous oxidant are continuously fed into and are caused to flow rapidly through a confined cracking zone. In the zone, the carbonaceous fuel is burned in the presence of, but for the most part separate from, the hydrocarbon feed—to provide the heat necessary for cracking the latter to cracked products. The feedstock is fed into the cracking zone in the form of one or more streams separate from the carbonaceous fuel and the oxidant. The solid fuel and the major portion of the oxidant are preferably kept separate from one another until they enter the cracking zone, and the carbonaceous fuel is introduced in a substantially intervening relationship between the feedstock and the oxidant, thus discourging combustion of the feedstock. The rate of combustion is controlled as necessary, by adjustment of particle size, air preheat temperature, fuel/oxidant ratio and intensity of mixing of fuel and oxidant, for sustaining the combustion of said particles substantially throughout the length of the cracking zone. Preferably, combustion of said particles is completed substantially at the downstream end of said cracking zone or at least prior their departure from the reactor. Thus, the hot, high emissivity, incandescent, burning carbonaceous fuel particles radiate heat into the feedstock substantially throughout the entire length of the cracking zone, thus continually adding heat to the reaction mass to make up for heat abstracted by the endothermic cracking reaction. If the fuel is substantially completely burned to ash and hot combustion gases on reaching the downstream end of the cracking zone, the necessity of recovery and rehandling of fuel solids is eliminated. As a consequence of the relatively low hydrogen content of the solid carbonaceous (as opposed to most liquid hydrocarbon) fuel, the by-product gases are low in water vapor content. Thus, the vapor pressure of water in the reaction zone is substantially reduced, with consequent reduction of loss of product through the water gas reaction.

As indicated above, the carbonaceous fuel is burned substantially separate from the hydrocarbon feed in the same chamber in a side-by-side, adjacent relationship. The terminology "substantially separate" is intended to indicate that throughout its exposure to the burning fuel, the feedstock is kept sufficiently out of contact with the fuel and oxidant to prevent combustion of a major portion of the feedstock. It is not necessary to trace the exact flow paths, concentration gradients or lines of demarcation between the streams of feedstock and burning fuel to determine whether this condition has been met, in view of the fact that hydrocarbons generally combust much more readily than solid carbonaceous fuel. Accordingly, any hydrocarbon fuel which is subjected to sufficient contact with burning fuel and oxidant to ignite same will compete vigorously with the carbonaceous fuel for any available oxygen and the question of whether the major portion of the feedstock is being kept sufficiently separate from the fuel and oxidant may be determined from analysis of the combustion and cracking products by procedures known to those skilled in the cracking art.

In accordance with certain apparatus aspects of the invention, an improved cracking reactor of the type having fuel, feedstock and oxidant introduction means, a cracking chamber and quenching means, is provided. The cracking chamber of such a reactor is defined by upstream and downstream ends connected by side wall means. The transverse spacing of the wall means may vary from point to point along the length of the reactor, but the side wall means should be free, at least in that portion of the cracking chamber upstream of the quenching means, from abrupt changes in cross-section, from choke-like restrictions and from wall roughness and projections of a character which would bring about thorough turbulent mixing of the feedstock and fuel flowing through the chamber. The length of the cracking chamber may be equal to or less than, but is preferably greater than, its width. The feedstock introducing means is (are) connected with the interior of the chamber through a nozzle means situated at the upstream end of the chamber. The nozzle means include(s) a stream-forming member for forming the feedstock into a stream and projecting it through the chamber along a flow path which extends downstream in the chamber and is spaced inwardly from the side wall means thereof.

In accordance with the improvements provided by the present invention, the aforesaid type of reactor is equipped with a stream-forming member formed and disposed for confining at least the major portion of the feedstock stream to a flow path which occupies less than about half of the transverse cross-sectional area of the cracking chamber along that portion of its length which is upstream of the quench means. Preferably, the stream forming member is a substantially straight run of tubular conduit having a generally circular cross-section and a length to diameter ratio of at least about twenty to one, which terminates in an unrestricted opening at the upstream end of the cracking chamber, said opening being spaced inwardly from the side wall means of the chamber on all sides. Surrounding the feedstock inlet at least in part (and preferably substantially completely) and spaced outwardly therefrom in the first end is (are) means for introducing at a controlled rate a continuous flow of solid carbonaceous fuel into the cracking chamber with components of motion downstream in said chamber and divergent from the general direction of movement of the feedstock stream. Surrounding the fuel inlet means at least in part (and preferably substantially completely) and spaced outwardly from the fuel introducing means is (are) oxidant introducing means for producing an envelope of oxidant surrounding the fuel and for directing the oxidant downstream while keeping it spaced outwardly from at least the major portion of the feedstock stream. Any known means for quenching and recovering the cracked products may be connected with the downstream end of the cracking chamber, but it is preferred to employ the eductor disclosed herein.

The combination of the stream-forming means which confines the feedstock stream as above described and the solid fuel introducing means which imparts to the fuel a component of motion divergent from the direction of the feedstock stream coacts to maintain the feedstock stream and buring fuel substantially separate from one another along that portion of the length of the cracking chamber upstream of the quenching means. That fact that the fuel solids introducing means at least partly surrounds the feedstock introducing means and is between the feedstock and oxidant introducing means tends to shield the feedstock stream from the oxidant and further tends to bring about consumption of most of the oxygen before much inter-diffusion of the feed and oxidant can take place. While in actual practice the feedstock stream on the one hand and the burning fuel and oxidant on the other may not actually continue throughout the entire length of the cracking chamber as substantially completely discrete and physically separated streams, it should be apparent that if all but a small portion, i.e. less than about 20% of each stream is prevented from diffusing into the other, as a result of the above-described features of the reactor, the requirement of keeping the streams "substantially separate" will be amply fulfilled. The extent of inter-diffusion between the streams may be determined by calculation from an off-gas and cracked products analysis using formulae and assumptions familiar to persons skilled in the analysis techniques employed in the cracking art, or may be determined by the use of radioactive tracer elements.

The eductor, which comprises another apparatus aspect of the present invention, is a product withdrawal arrangement. It is applicable to any cracking reactor which, in the course of its operation, has available substantially separate streams of cracked products and combustion products in different but adjacent portions of the same chamber, and is particularly effective in that category of reactor which produces a stream of combustion products which at least partly surrounds a substantially separate stream of cracked products. The reactor discussed above falls in this category. The eductor is a tube of restricted cross-section which is placed in the reactor so as to have one or more inlet parts in the cracking chamber at a chosen point or points where the concentration of cracked products is higher than the concentration of combustion products. Preferably the chosen point is that point where the cracked products are present at substantially the highest concentration available in the cracking chamber when the reactor is in operation. In a furnace having a circular cylindrical cracking chamber with an axial feedstock nozzle surrounded by annular fuel and oxidant injection means located at its upstream end, the eductor tube is preferably mounted on the longitudinal axis of the chamber, downstream of the feedstock nozzle with its inlet port directed toward the feedstock nozzle to permit direct entry of the cracked products without change of direction. The port and tube are preferably of lesser cross-sectional area than the portion of the cracking chamber in which they are located. The minimum distance between the feedstock nozzle and the eductor tube inlet port is determined by the rate at which the feedstock and resultant cracked products flow through the chamber and the residence time needed to complete the cracking reaction. The maximum distance is determined by the distance over which the feedstock-product stream and the fuel/oxidant-combustion product streams may flow in side-by-side relationship and remain substantially separate. Adjacent the inlet port, in the cracking chamber, and preferably surrounding the port at least in part, is (are) passage means constituting a flow path discrete from that through which the products are withdrawn, for conducting combustion products away from the port. In the tube, preferably closely adjacent the port, are means for introducing quench fluid into the products which depart through the tube. Preferably, means are provided for circulating coolant, which may be quench fluid, within the walls of the tube. The eductor tube is connected with means for producing a controlled negative pressure differential between the interior of the reaction zone proper and the interior of said tube, whereby the cracked products may be recovered in said tube in preference to combustion products and ash.

CONSIDERATIONS RELATING TO MATERIALS, OPERATING DATA AND PRODUCTS

In general, the invention may be carried out with any and all fluidic aliphatic and alicyclic hydrocarbons. "Fluidic" refers to hydrocarbons which may be gaseous, vaprous, liquid or even solid or semi-solid at ambient temperatures, but which are capable, either in their natural state or after suitable pretreatment known to persons skilled in the cracking art (e.g. heating, atomization, dilution, and so forth), of being readily pumped, transferred through conduits and fed to the process as above described, in a fluid condition. It is preferred, however, to use hydrocarbons which may be introduced into the cracking chamber in a gaseous (includes both true gases and vapors) state. Thus, the term "hydrocarbon," sometimes referred to as "more saturated hydrocarbon," as used throughout the specification and claims, refers to any aliphatic or alicyclic hydrocarbon or mixture of hydrocarbons having a higher hydrogen to carbon ratio than that of the cracked products. Preferably, primarily for economic reasons, the hydrocarbon feed for making mixtures of acetylene and ethylene will consist essentially of one or more of the lower aliphatic saturated hydrocarbons having at least two to about ten carbon atoms per molecule, namely; ethane, propane, butane, isobutane, pentane, hexanes, octanes, nonanes, decanes. Commercial hydrocarbon mixtures derived from petroleum, such as naphtha, liquified petroleum gases or refinery by-product gases are also applicable. The process is also applicable to methane, but, in general, to obtain attractive yields of acetylene and ethylene by the process of this invention it is highly desirable that the feed contain substantial proportions of hydrocarbons higher than methane, especially hydrocarbons in the range of $C_2$ to about $C_{10}$. Of course, heavier feeds may be used, especially if different products are desired.

The carbonaceous fuel may be any finely divided, e.g. about 60 mesh or smaller, combustible, solid, particulate, essentially carbonaceous material, e.g. characterized by a hydrogen content of less than about 15 percent, which is or has been treated to render it substantially "free flowing." Thus, for example, ground hard coal, devolatilized coal and char obtained by low temperature carbonization of coal may be used. It is a feature of the invention that carbonaceous fuels of widely varying ash contents may be employed with economic advantage, but superior performance is obtained when operating with coal having a high ash melting point, e.g. greater than about 3000° F. Such coals are readily available. In addition to the carbonaceous solid fuel mentioned above, supplementary fuel gas may be employed in relatively minor amounts, e.g. in sufficient amounts to supply not more than about 20 percent of the total heating value of the carbonaceous fuel and fuel gas combined. The supplementary fuel gas may be introduced separate from or in admixture with the carbonaceous solid fuel. It would not involve a departure from the spirit of the invention to employ supplementary liquid fuel; however, it will be appreciated that supplementary gaseous fuels are more conveniently handled. Supplementary fuel gas can play an important role in helping to maintain combustion during the warm up phases of reactor operation. However, once steady temperature conditions have been attained, the supplementary fuel gas may be backed out and the reactor may be operated "substantially exclusively" on carbonaceous fuel, e.g. except for a very small gas-fueled pilot light to assist in ignition, only carbonaceous fuel is burned in the reactor.

Any oxygen bearing gas that will readily support combustion may be useful as the oxidant in the process of the invention. In this connection, air has been employed with success. However, it will be appreciated that certain benefits, including a higher concentration of the desired products in the product stream, may be attained when oxygen is present in a higher concentration than is provided by atmospheric air. Thus, oxygen enriched air, oxygen and other gases may also be employed as oxidant.

For quenching, it is possible to use any suitable fluid that is not deleterious to the products or to the internals of the reactor and collection system. Water is frequently employed. Also, refratcory hydrocarbon oils may be used. Gaseous fluids, especially gaseous hydrocarbons, including feedstock or recycled cooled products of the cracking reaction, may also be employed.

The operating data for the process include various considerations pertaining to the container or chamber in which the reaction takes place, the type and rate of flow of the materials, the temperature and pressure employed, the manner of quenching, and the residence time.

The interior of the container or reaction chamber will generally be in the form of a cylinder, usually elongated. In this specification and claims the term cylinder is used in a broad sense requiring neither a circular cross section nor strictly straight or parallel sidewalls. The reaction chamber should be lined with any high temperature resistant refractory material which is well adapted to withstand erosion due to high gas velocities and friction of solid particles combined with temperatures in the range of 2700° F. and higher. Such refractories are available commercially, and high alumina castable refractory materials have been found most suitable. The cracking chamber and the introducing means for the fuel and oxidant are preferably so dimensioned and disposed that the fuel and oxidant travel through the cracking chamber closely adjacent to at least one refractory sidewall thereof.

The feedstock, solid fuel and oxidant streams flow concurrently (in the same general direction). The application of the term "stream" to the fuel solids may seem inappropriate, since this term is most frequently used to describe a flow of liquids or gases. Nevertheless, it serves a useful function in this dosclosure, indicating that the solids move over a given flow path in a substantially uniform concentration or distribution.

The feedstock, fuel and oxidant streams may be completely separate from one another at their points of introduction. However, it should be understood that a limited degree of mixing of said streams prior to reaching the cracking zone may be possible and in some cases desirable. For instance, some of the oxidant may be mixed with fuel solids before introduction into the cracking chamber, so long as the major part of the combustion takes place in said chamber, e.g. part of the oxidant may be used as a gaseous conveying/disbursing medium for the fuel. When operating with heavy feedstocks, a small portion of the oxidant may be used as an atomizing medium for the feedstock. It should be understood however that only a relatively small portion of the total oxidant employed in the process is used for atomizing feedstock, and every attempt is made to minimize diffusion between the main stream of oxidant and the hydrocarbon feedstock stream. Thus, substantially all of the oxidant (excluding amounts used to assist in the introduction of feed and fuel to the cracking zone) is introduced to and conducted through the cracking zone in such a manner as to maintain it substantially separate from the feed stream until the streams have been diverted into separate recovery zones, or quenched or otherwise cooled or treated to preclude reaction between them.

The manner of introduction of the fuel solids is preferably such that they are introduced as a stream intervening between the feedstock stream and the oxidant stream(s). The fuel solids have, in addition to their longitudinal velocity component, a velocity component perpendicular to the cracking chamber axis and towards the oxidant stream(s). The object of providing the perpendicular velocity component is to gradually diffuse the solid particles into the oxidant stream(s). This results in a gradual burning of the fuel solids which continues from one end of the cracking zone to the other. The perpendicular velocity component will be relatively small in comparison to the longitudinal velocity component of the fuel solids, but should be sufficiently large to incorporate substantially all of the fuel solids into the oxidant stream(s) before reaching the end of the cracking zone.

When the flowing stream of feedstock and resultant products and the substantially separate stream of burning solid fuel, moving side by side, reach that portion of the cracking chamber where quenching is to take place, the necessity for maintaining separate streams ends, although as will be explained hereinafter, certain valuable economic and technical advantages will accrue from maintaining the separate identity of these streams during and after quenching. Thus, although it is possible to quench both the cracked products and combustion gases together in a manner which promotes thorough turbulent mixing of the quench fluid with both the cracked products and the combustion gases, thus destroying the separate identity of said streams, the cracked products are preferably withdrawn from the reaction chamber separate from the combustion gases and are thereafter promptly quenched. Such practice facilitates economic recovery of the products and increases the thermal efficiency which may be obtained when using the combustion gases in heat exchangers, boilers and the like as a heating medium.

The types of flow which best promote the retention of the feedstock and oxidant in separate streams as above described may be readily attained. In the case of the feedstock, a linear flow is desired. The flow of oxidant should be somewhat turbulent, but not sufficiently turbulent to fully destroy its character as a stream or encourage diffusion into the feed along the axis of the cracking chamber. Persons skilled in the art are aware of how to create a flow of gases characterized by linearity or any desired degree of turbulence by adjustment of gas velocity and smoothness of flow path.

Those skilled in the art will readily appreciate that the charging rates for feedstock and oxidant may vary widely depending upon the dimensions of the cracking chamber. The dimensions of the cracking chamber may be varied widely without detriment to the process. However, for a cracking chamber of given dimensions, and given the residence time, temperatures and pressures to be maintained within the process, one skilled in the art can readily compute the proper charging rates for oxidant, feedstock and solid fuel. The residence time for the feedstock should be in the range of 0.1 to 0.0001 second. The temperature and pressure conditions within the cracking zone will be discussed hereinafter.

Although, as explained above, it is not feasible to state limiting absolute values for the charging rates for the materials introduced into the reaction zones, certain generalizations can be made in regard to the relative volumetric charging rates for these materials. The fuel and oxidant should be introduced in a ratio which produces a stable flame. For any given reactor the proper ratio may readily be determined empirically. The reactor disclosed herein has been operated with acceptable flame stability while introducing fuel and oxidant in about stoichiometric proportions and while introducing the air at 80 percent to 150 percent of the rate theoretically required to produce a stoichiometric mixture of oxygen and fuel. In order to determine the proper charging rate for the hydrocarbon feedstock, one may calculate the heat release of the fuel-oxidant mixture which is employed and then, by known thermal chemistry and thermo-dynamics, estimate the amount of cracking stock that may be pyrolysised with a given quantity of fuel and oxidant. But in any case, optimum proportions of the fuel, oxidant and cracking stock can be established empirically.

Certain valuable benefits may be realized by controlling the relative velocities of the feedstock stream and the burning stream of carbonaceous fuel and oxidant. By holding the velocities of said streams as nearly equal as possible, interfacial slippage and turbulence between the streams is thereby minimized to the fullest extent possible, and the diffusion of feedstock into the oxygen stream, with consequent loss by combustion, it is thereby discouraged. Thus, where minimum loss of feedstock through interfacial mixing is highly critical it may be found desirable to control the velocities of flow of the burning stream and of the feedstock stream to maintain them "about equal," e.g. no more than about 20 percent difference. In this connection, it should be understood that adjustments can be made in the relative velocities of the streams without changing the relative volume flow rates of combustion gases and feedstock by varying the cross-sectional areas of the streams. Thus, one can attain the desired equality of veloctiy between the burning stream and the feedstock without destroying the quantitative and thermal balance between the amount of feedstock on the one hand and the amounts of fuel and oxidant on the other.

For the purpose of discussing the temperatures which should be employed in the process of the invention, it may be useful to define certain zones: external oxidant preheat zone; external feedstock preheat zone; internal feedstock preheat zone; cracking zone; and quenching zone. The external preheat zones are chambers outside the cracking chamber, in which zones preheating takes place. They may be heat exchangers, furnaces or the like in which the feedstock and oxidant are separately heated before introduction into the cracking chamber.

Preheating of the oxidant stream is highly desirable and, where the $O_2$ concentration in the oxidant stream is low, may even be essential. When needed, the external oxidant preheat zone is provided for this purpose. Air preheat temperatures ranging from about 200° to about 2000° F. are applicable, and a temperature of about 500°–1500° F. has been found quite satisfactory in actual practice.

Because of the endothermic character of the process, certain definite advantages may be realized by preheating the feedstock to the maximum temperature it can withstand without undue decomposition and consequent fouling of the preheaters. Thus, the feedstock should preferably be heated to a temperature slightly below the temperature of incipient cracking. The external feedstock preheat zone is provided for this purpose. For many feedstocks a suitable maximum will be a temperature in the range of about 1000° F. to about 1500° F.

The internal feedstock preheat zone is that portion of the upstream end of the cracking chamber in which the externally preheated feedstock stream is heated still further to the cracking temperature. The hydrocarbon feedstocks to which the present invention is applicable may be cracked to acetylene and mixtures of acetylene and ethylene by heating said feedstocks in the internal feedstock preheat zone temperatures in the range of about 1500° to 3500° F., with temperatures in the range of about 2000° to about 3200° F. being preferred. Thus, upon introduction into the cracking chamber, the temperature of the feedstock should be raised as rapidly as possible until within the aforesaid range(s).

The cracking zone is that portion of the cracking chamber in which the feedstock is at cracking temperature. The temperature of the feedstock is measured in or near the center of the feedstock stream, preferably near the upstream end of the cracking zone. Temperatures somewhat higher than those of the feedstock may be found in the surrounding burning stream, so care should be taken to see that it is the temperature of the feedstock and not of the flame that is measured.

The maintenance of stable temperature in the feedstock stream in the cracking zone is extremely important in obtaining the kind of time/temperature history which leads to the highest yields and the best thermal efficiency. In accordance with the invention, the rate of heat release from combustion of the carbonaceous fuel is adjusted to be substantially the same as the rate of heat consumption from cracking of the hydrocarbon stock and from normal losses, so that energy exchange via radiation and any other applicable heat transfer mechanism(s) between and the cracking feedstock stream tends to maintain both streams at the desired temperature. On at least three counts, carbonaceous fuels have advantages which render them superior to hydrocarbon gases and vapors for this purpose.

First of all, the finely divided carbonaceous fuels offer great latitude of control over combustion rate. Unlike gaseous hydrocarbons, carbonaceous solids can easily be ground to varying particle sizes, and the combustion rates of carbonaceous solids are significantly affected by changes in particle size. Thus, through a combination of adjustments in the particle size of the carbonaceous fuel, the oxidant preheat temperature and the fuel-oxidant mixing intensity, the combustion rate of the fuel may be varied widely, permitting easier matching of the combustion rate to the cracking rate than is possible with gaseous and vaporous hydrocarbon fuels.

Secondly, in order that the above-described match between combustion and cracking rates may extend substantially throughout the cracking zone, a flame that is both long and steady is required. The cracking chamber may be of significantly greater length than diameter and, if the flame is to continue to radiate heat to the feedstock throughout the length of the cracking chamber, the flame will have to extend throughout the length of the chamber. When it is attempted to produce a long flame with hydrocarbon gases and vapors, it will be found that a steady flame is exceedingly difficult if not completely impossible to attain, at least under the conditions that prevail in a cracking chamber. By a "steady" flame is meant one which, to a very high degree, maintains substantially uniform length and is substantially free from wavering from side to side. The flickering, unstable flames that are obtained when it is attempted to produce a lengthy flame in a hydrocarbon cracking chamber by burning hydrocarbon gases and/or vapors reduce the thermal efficiency of the cracking step and lower the yield by intermittently intruding upon the feedstock stream. Surprisingly, however, it has been found possible to produce long flames of an exceptionally stable character in a cracking zone, using carbonaceous solid fuels, thus improving both thermal efficiency and yield.

Thirdly, the emissivity of the flames of solid carbonaceous fuels is higher than the emissivity of the flames of hydrocarbon gases. The incandescent hot burnning particles of carbonaceous solid fuel radiate heat into the feedstock stream at a faster rate than a stream of hydrocarbon gas of the same B.t.u. content. As has been explained above, it is important that the heating of the feedstock to its cracking temperature in the internal preheat zone takes place as rapidly as possible, and the high emissivity of the flame of the solid carbonaceous fuel tends to produce more rapid heating than the flame of a hydrocarbon gas or vapor fuel.

Where the solid carbonaceous fuel has a substantial ash content, as is true of most coals, a definite advantage accrues from proportioning the rates of introduction of feedstock, oxidant and solid carbonaceous fuel in such a way as to maintain temperature conditions below the ash fusion temperature of the solid fuel and solid combustion products in substantially every portion of the preheating and cracking zones through which they may pass. If temperature conditions above the ash fusion temperature are maintained, then any object within said zones which may have a lower temperature than the ash fusion temperature will tend to acquire a coating of coalesced ash which increases in thickness until an acceptable equilibrium thickness is reached or the flow of material through the reactor is impeded by ash deposits to the point that there is a voluntary or involuntary shut-down for ash removal, or steps are taken to continuously or periodically remove the ash during furnace operation. If it is desired to operate above the ash fusion temperature for and reason, the accumulation of an equilibrium thickness of ash may be quite acceptable provided the sizes of the parts which will tend to accumulate ash are chosen in such a manner that adequate space is left for process materials other than ash to flow through or past them, when the equilibrium thickness of ash is in place. Periodic shutdowns are to be avoided, if possible, due to the lengthy procedures involved in cooling off refractory-lined reactors and bringing them to reaction temperature again. Reactors with means for continuously removing ash deposits may be used in operations above the ash fusion temperature if desired. However, the simplest alternative from the standpoint of minimizing the complexity of the operation and the reactor is to operate below the ash fusion temperature, and such mode of operation is preferred. When this temperature limitation is observed, there will be no substantial tendency for ash to coalesce on the walls or quenching means in quenching zone or on the eductor to be described hereinafter, and therefore no necessity of removing the resultant deposits therefrom.

The quenching zone is that portion of the cracking chamber or other adjacent chamber in which the resultant cracked products are cooled until well below cracking temperature. The cooling should be carried out as rapidly as possible. Generally, the products should be quenched to a temperature of 800° F. or less. More preferably, the quench fluid temperature, flow rate and mixing intensity should be controlled to lower the temperature of the products and/or combustion gases to a temperature not greater than about 500° F.

The process may be conducted at super-atmospheric pressure, atmospheric pressure and sub-atmospheric pressure. Operation at atmospheric pressure has the advantage of convenience. However, under certain conditions, higher yields may be obtained by operating at a pressure of less than one atmosphere.

Persons skilled in the art are thoroughly aware of the residence times (time intervals during which a feedstock and resulting products are subjected to cracking temperatures) required to convert various hydrocarbons to preselected products, including those hydrocarbons and products disclosed herein. Generally speaking, a residence time in the range of about $10^{-1}$ to about $10^{-4}$ seconds is appropriate. Under certain circumstances, e.g. when low residence times are employed, it may be found difficult to have the feedstock and burning stream move at about the same linear velocity and at the same time completely burn the solid fuel within the cracking zone. It would not therefore be contrary to the spirit of the invention to conduct part of the combustion of the solid fuel outside the cracking zone, before the fuel stream is brought into proximity with the feedstock stream and/or after cracking has been completed and the products have been separated from the fuel. Thus, although it is preferred that the solid fuel be burned substantially to completion in the presence of the foodstock, such preference does not rule out the possibility of igniting and partly burning the solid fuel out of the presence of the feedstock. Beneficial results can be attained when at least the major portion of the solid fuel is burned in the presence of the feedstock. If a portion of the fuel is burned after passing through the cracking zone and after being separated from the products, such burning may be facilitated by injection of additional oxidant into the combustion product stream. It is apparent, however, that the simplest procedure is to conduct substantially all of the burning of the solid fuel in the presence of the feedstock and the maximum benefits from radiant heat energy exchange between the burning stream and the feedstock are thereby obtained, thus making this the preferred mode of operation.

The preferred products of the process will be acetylene, ethylene and various combustion product gases. Generally speaking, it is not considered economical under present conditions to attempt to produce acetylene and no ethylene or vice versa. However, by varying the feedstock to fuel ratio, or the temperature in the cracking zone, or the residence time or a combination of these and/or other process conditions, the ratio of acetylene to ethylene in the products may be varied. The acetylene/ethylene ratio which is chosen will depend upon complex economic variables and especially on the use to which the product stream will be put and the techniques used for separating the acetylene and ethylene from the combustion gases.

The acetylene and/or ethylene may be separated from the cracking chamber effluent and, if desired, may be purified by any combination of known techniques, of which there are many. However, it is preferred that substantially all of the acetylene and ethylene be withdrawn from the cracking chamber in a stream which contains less than half of the combustion product gases and that the remainder of the combustion gases depart the cracking chamber as a separate stream. The acetylene-ethylene stream is then treated in accordance with any known technique to separate the unsaturated products from the combustion products. A wide variety of separation techniques are contemplated, including, but not limited to adsorption, selective chemical reaction, high pressure distillation, solvent extraction and so forth.

DESCRIPTION OF A PREFERRED EMBODIMENT

Figure 6:
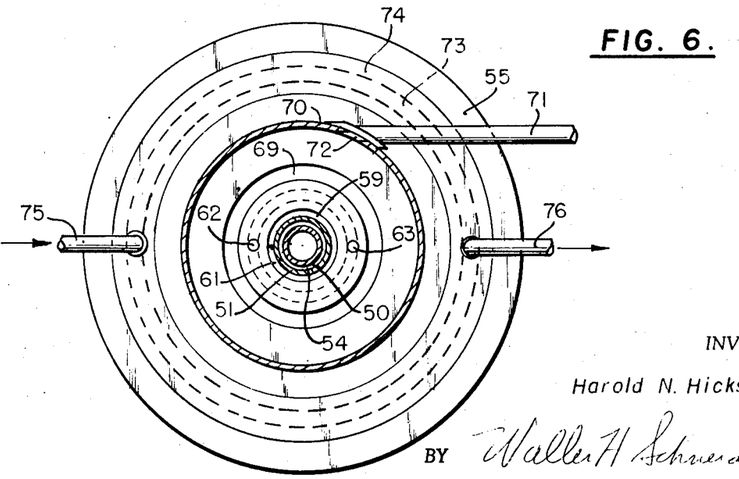
FIG. 6 is a sectional view of the burner assembly of FIG. 5A, taken along section line 6—6.
Figure 7:
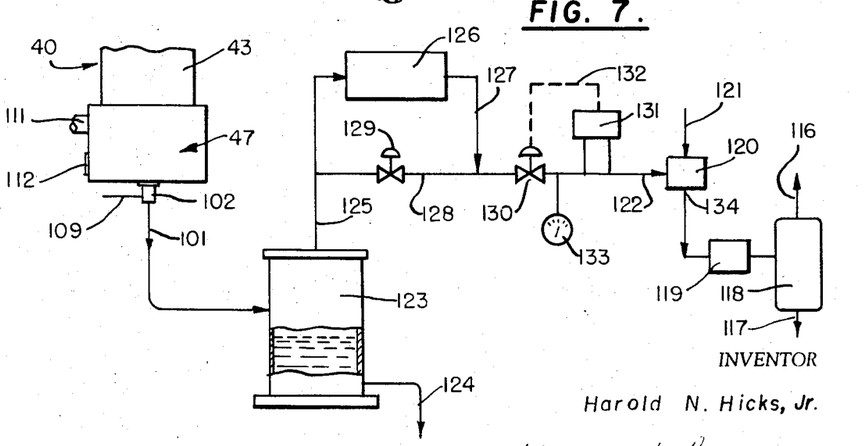
FIG. 7 is a diagram of a collection system which is connected to the eductor tube of the cracking chamber shown in FIG. 5B.

A preferred embodiment of the apparatus aspects of the invention will now be described with the aid of the accompanying drawings. In the preferred embodiment shown in FIGS. 2 through 7, there is disclosed a solids feeding apparatus (FIGS. 2–4), a thermal cracking apparatus (FIGS. 5A, 5B, and 6) and a recovery system (FIG. 7).

The provision of a solids feeding apparatus capable of delivering a highly uniform flow of solids to the burner assembly is highly essential to the attainment of a stable flame in the cracking chamber. Difficulties in attaining this objective in small experimental systems may possibly have been a deterrent to the development of solids-fueled cracking reactors in the past, since the solids-feeding problems that were experienced in the initial stages of making the present invention were substantial. The problems of feeding solids uniformly are compounded in small systems because the ratio of solid particles dimensions to feeder dimensions decreases as a given feeder is scaled down. Erratic and cyclic fluctuations in solids delivery rates result in experimental data which is quite different than that which would be obtained under highly stable conditions. The low residence times associated with the object of this invention make the problem of uniform solids feeding particularly important. Heat transfer from an annular combustion region to a central cracking region is dependent on flame luminosity or emissivity which is in turn dependent on the concentration of carbonaceous solids in the primary air stream. Cyclic solids flow, solids agglomerate formation in the feeding and conveying system, and dead or stagnant zones in the conveying system which erratically accumulate and discharge solids all result in pronounced deterioration in system performance. The system which was developed to feed the solids in the desired manner is presented as a disclosure in this patent application because, so far as the inventor knows, no suitable experimental apparatus of this type was available heretofore, and consequently achievement of the results included herein in small systems appears to be contingent on the availability of the disclosed apparatus or one capable of equivalent performance.

The experimental solids feeding apparatus disclosed herein may be supported in any convenient manner (FIG. 2), but it is preferred to hang it from an overhead support 20 through a system of supporting members including a weight measuring device 21, such as a strain gauge. As is well known to those skilled in the art, such gauges are capable of converting a load or strain into an electrical signal representative of the weight suspended therefrom, which electrical signal may be conducted to a remote indicating panel or control device for monitoring or controlling the delivery rate of carbonaceous fuel. Mounted on hopper 22 is an electric motor 23 provided with a reduction gear and thrust bearing assembly 24. The latter is connected by suitable coupling means to a shaft 25 upon which are mounted an agitator 26 in the lower portion of the hopper and a feed screw 27 in an outlet tube 28 connected to the bottom of the hopper. The reduction gear 24 is preferably provided with a variable speed drive to permit control over the rate of rotation of the feed screw and thus over the solids delivery rate. Pulverized coal suitable for boiler firing (60% by weight will pass 200 mesh), which is among the various fuels useable in this system, has an angle of repose of 90°, thus necessitating precautions to insure that the feed screw 27 runs full. The agitator 26 tends to maintain the bulk density of the solids constant and independent of solids inventory. This in turn results in a solids rate which is independent of the amount contained in the hopper. The agitator also serves to prevent bridging and resultant fluctuations in the solids rate.

Figures 2, 3, 4:
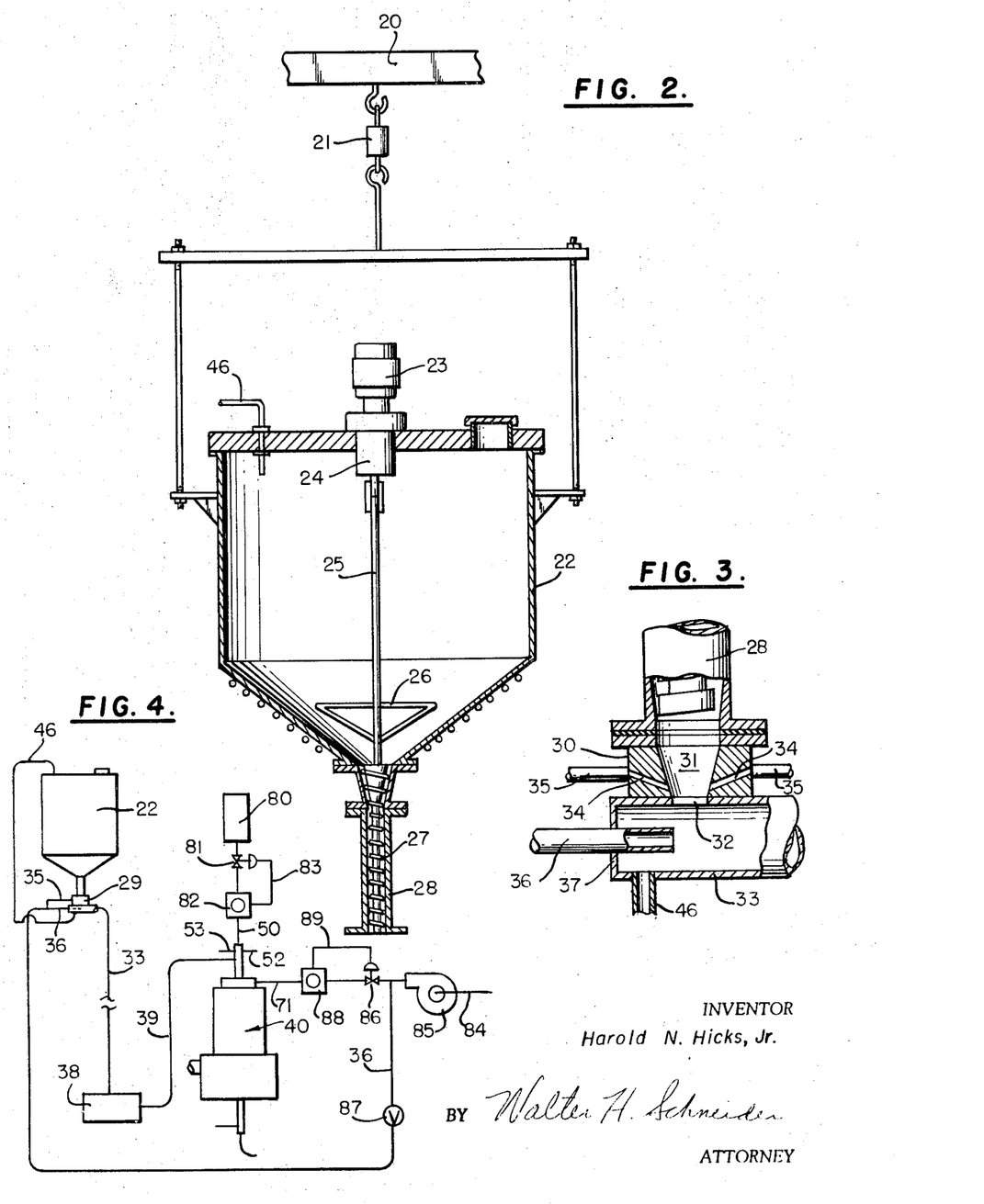
FIG. 2 is the first of seven figures disclosing a portion of a thermal cracking apparatus constituting a preferred embodiment of the apparatus of the present invention, FIG. 2 being a sectional view which shows a solid fuel storage and feeding device for such system.
FIG. 3 is a partially broken-out sectional view showing a solids ejector which connects to the bottom of the feeding device of FIG. 2.
FIG. 4 is a diagram of the solids feeding system, including the feeding device and ejector of FIGS. 2 and 3, a grinder and associated piping.

It will be noted that the feed screw is divided into two sections, an upper section of generally frusto-conical configuration which is the pickup section; and a lower or conveyor section which is of uniform flight diameter throughout its length. Although those skilled in the art will readily recognize that these dimensions can be widely varied and that there is no intention to be bound thereby, the following dimensions and properties have been found desirable in such screw. The preferred conveyor section comprises a 1/1 pitch to diameter screw, 1½ inches in diameter and 12 inches long, with a 0.79 compression ratio (ratio of intake channel depth to discharge channel depth), and a flight clearance varying from 0.005 inch at the inlet to 0.007 inch at the discharge. Both the screw and the barrel 28 are machined from "Ry-Alloy" (trademark of the Ryerson Company for their hardenable tool steel product) and subsequenly heat treated to a 62–64 Rockwell C hardness. The screw root surface is polished to mirror like surface. This screw is designed to feed 10–40 pounds per hour at 25–100 revolutions per minute. The progressively decreasing depth of the discharge channel of the feed screw results in compression of the coal in the screw as it proceeds from the top of tube 28 to bottom, so that when the fuel reaches the discharge end of the screw, the fuel is packed quite closely between the flights of the screw. This tends to prevent air leakage from the discharge to the pickup of the screw and corresponding fluctuations in solids feed rate.

Outlet 28 is connected with a solids ejector nozzle assembly 29 including an upper body portion 30 having a tapered bore or nozzle 31 of frusto-conical (60° angle) configuration therein. The conical nozzle is mounted directly below and in communication with feed screw 27, and has a longitudinal axis coinciding with that of the tube 28, and has an internal diameter at its upper end corresponding to the internal diameter of the latter. The nozzle tapers down to an outlet 32 of approximately ⅓ the foregoing diameter, at which point it opens into a conduit section 33. A plurality of passages 34, provided with supply conduits 35, are interspersed about the conical surface, intersecting tangentially therewith and at a 45° angle to its longitudinal axis. The purpose of the passages 34 is ot conduct air or other gas in a swirling downward movement to prevent carbonaceous fuel solids from bridging across the conical walls. The supply pipes 35 are connected with any suitable source of pressurized flowing gas, e.g. air, for this purpose. In a solids ejection nozzle in which the nozzle tapers from 1.5 inch inlet to a 0.5 inch outlet and in which there are three tangentially disposed 1/16″ passages 34 spaced at equal intervals about the periphery of the cone, an air flow of one-hundred s.c.f.h. has been found suitable.

The longitudinal axis of the conduit section 33, directly below the conical nozzle, is perpendicular to the axis of the latter. There is an opening in the conduit section 33 in registry with the outlet 32 of the conical section to permit fuel solids to enter same. A coaxial conduit 36 of smaller diameter than conduit 33 is positioned in the latter, and terminates in an open end adjacent the projected end of conical section 31, but does not block the outlet thereof. The conduit 36 is supported in place by the closed end 37 of conduit 33. In a solids ejection nozzle having the dimensions previously stated, and in which the conduit section 33 has a ¾ inch inside diameter and the air supply conduit 36 has a ¼ inch outside diameter, an air flow of approximately 600 s.c.f.h. has beeen found suitable for creating a reduced pressure (as compared to that in the hopper 22) in the conical section and assisting in the withdrawing of the coal solids therefrom. The provision of a conduit 46 connecting conduit 33 and hopper 22 has also been found helpful in that it tends to reduce or eliminate the pressure differential across screw 27.

The portions of the solids feeding system described thus far are for the purpose of establishing a controlled rate of flow of fuel solids in a conduit, such as conduit 33. However, in the process of setting up a controlled rate of flow of coal solids with a screw, agglomeration may occur, to a varying extent. Therefore, the solids feeding apparatus is provided with means for breaking up any such agglomerates that might form and for attenuating "small fluctuations" in the flow of solids coming from the feed screw. As will be apparent from FIG. 4, the conduit 33 extends to the inlet of a hammer mill type grinder 38. It will be noted that the largest part of the length of conduit 33 is disposed as a vertical run into the top of the grinder. The grinder, which may be cooled by a water jacket if desired, breaks up any agglomerates formed in the compression section of the screw 27 and discharges the ground fuel suspension through a screen (not shown) with one-sixteenth diameter round holes into a conduit 39 which extends to the fuel entry inlet 60 of the cracking reactor 40.

The system just described has been found adequate for feeding fuel solids over extended periods at acceptably stable rates appropriate for operation of the reactor disclosed herein. Since the ratio of solid particle dimensions to feeder dimensions will increase as the feeding system is scaled up, it appears that the problems of building an operable production scale unit would be no greater, and would probably in fact be smaller. The throughput of a production-sized solids feeding system might well reach 100 tons per day or higher. Grinding, metering and conveying equipment for such through-puts is readily available. A contemplated production sized unit could include a Fuller-Kinyon pump feeding ⅛ x 0 dry coal (less than 5% moisture) to a ball mill, rod mil or other grinding device capable of producing a pulverized boiler fuel. The grinder would discharge a continuous flow of solids and conveying air to the cracking reactor.

Other supporting apparatus for the reactor include supply and metering apparatus for the feedstock and supply and metering apparatus for the oxidant. Such equipment is quite familiar to persons skilled in the cracking art and it will not therefore be described in detail. However, examples of such equipment are illustrated schematically in FIG. 4. As shown therein, a supply 80 of feedstock is connected through pneumatic control valve 81 to recording flow controller 82 which controls valve 81 through a feedback control loop 83 to maintain a constant flow of feedstock into feedstock inlet tube 50 of the reactor 40. The controller 82 is of a type which has an adjustable set point, permitting preselective variable control over the feedstock flow rate any any given operating temperature. When the oxidant is air, a conduit 84 may be used to withdraw air directly from the atmosphere into a rotary centrifugal air pump 85 which discharges into a pneumatic flow control valve 86 and into a branch conduit 36 which feeds conveying air through a regulating valve 87 to solids ejector nozzle 29, including conduits 35. Such conveying air travels with the dispersed fuel solids through conduit 33, grinder 38 and conduit 39 and enters the reactor 40 through fuel solids inlet 60. Such air is sometimes referred to herein as primary air. The air which proceeds from blower 85 through valve 86 is sometimes referred to herein as secondary air. The valve 86, flow controller 88 and feedback loop 89 constitute a preselective variable control means for the flow of the primary oxidant stream which, after passing the controller, enters the reactor through inlet tube 71. Preheaters for oxidant and feedstock are conventionally used in conjunction with cracking reactors, and they (not shown) may be included in the foregoing system at any convenient location.

Figure 5A:
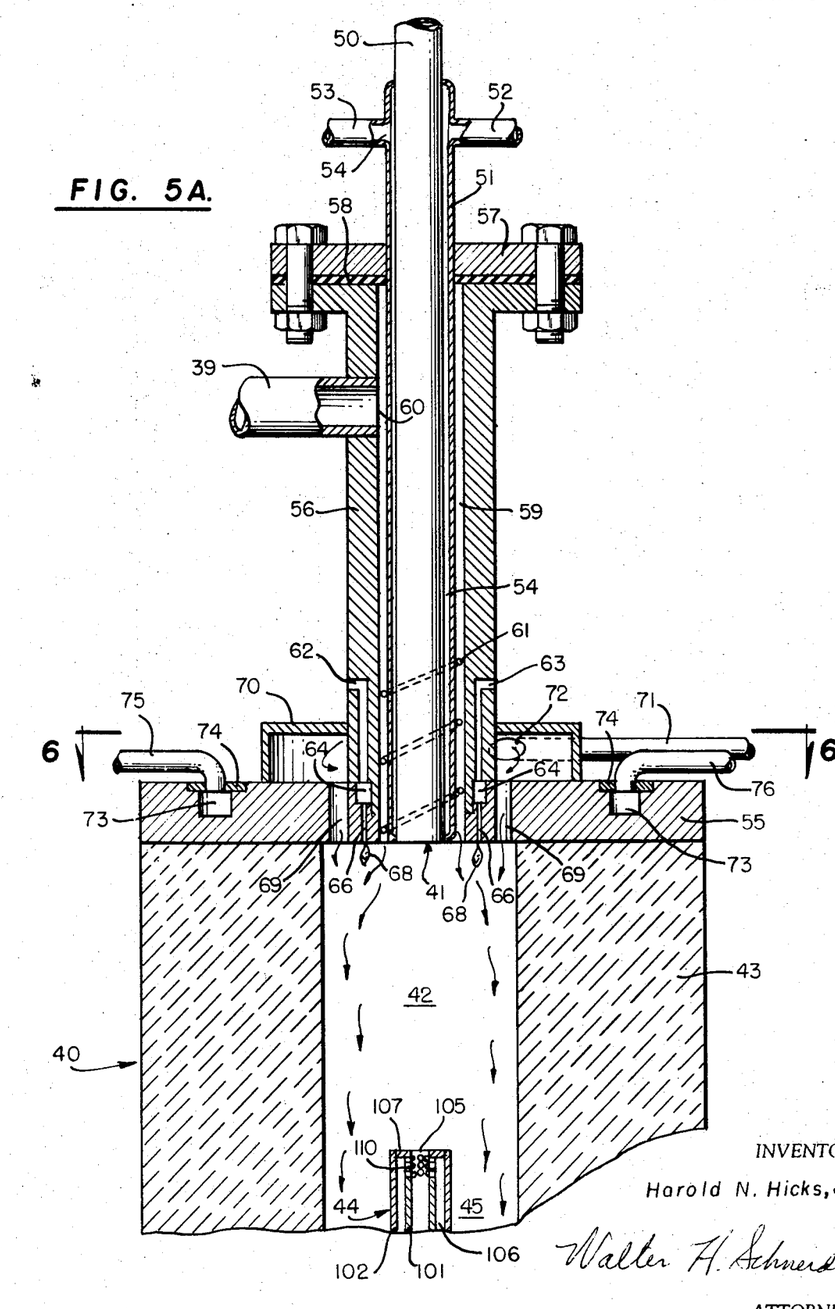
FIG. 5A is a sectional view of the upper portion of a burner and cracking chamber assembly which connects with the solid feeding apparatus shown in FIG. 4.
Figure 5B:
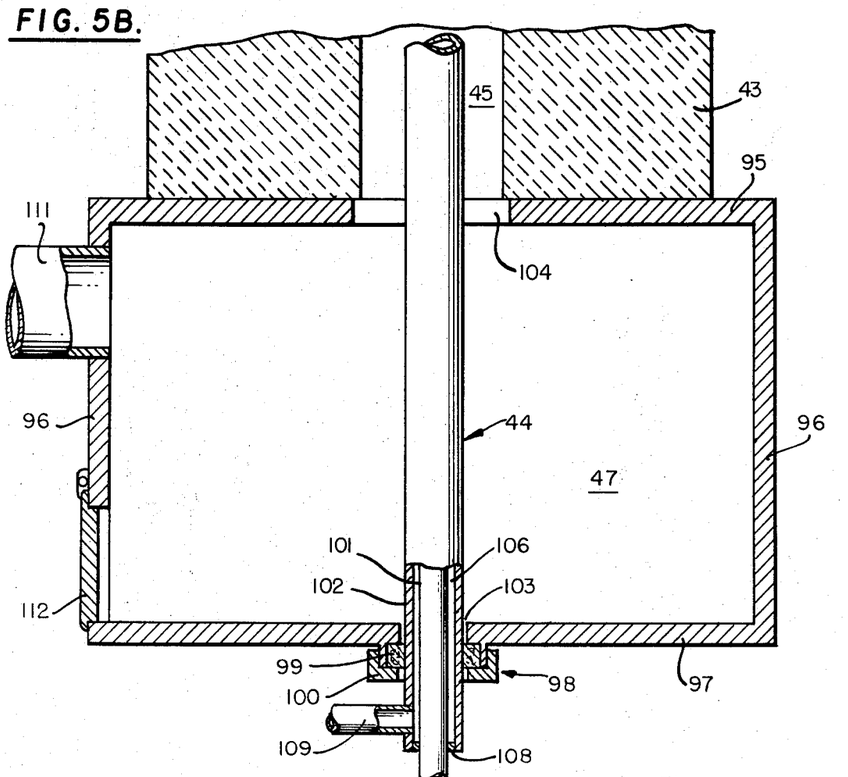
FIG. 5B is a sectional view of the lower portion of the cracking chamber shown in FIG. 5A and the product collection chamber which connects therewith.

The reactor 40 shown in FIGS. 5A and 5B includes the following sub-portions: cracking chamber 42 and its side wall means 43; burner 41; product eductor tube 44, including quenching means; and combustion product collection chamber 47 with off-gas and ash handling means.

The side wall means 43 of cracking chamber 42 is a cast tube of refractory material such as Harbison Walker Castolast G high alumina refractory cement. The tube is cast and cured in accordance with conventional procedures commonly employed by those skilled in the art of fabricating high temperature resistant refractory linings for cracking reactors, such as those used in the carbon black art. The tube employed in this preferred embodiment is of precisely circular cross section, has a uniform diameter and is straight throughout its length, and has the following dimensions: I.D. 3″; O.D. 12″. The inner surface of the wall means is free from turbulence-inducing projections and roughness throughout the length of the zone in which cracking is intended to take place. Thus, no sharp changes of direction, chokes, checkerwork, or other obstructions are included within that portion of the cracking chamber where cracking is to take place.

To the upstream end of the cracking chamber is secured a burner 41. The latter includes a base plate 55 which is connected to the refractory tube perpendicular to its longitudinal axis at the upstream end thereof. The plate 55 supports the inlet means for feedstock, oxidant and fuel and forms a closure or upstream end wall for the cracking chamber. The surface of plate 55 which faces chamber 42 is also referred to herein as the burner face. Although it is not required to be so, the burner face is planar in this embodiment, and the apertures through which the fuel, feedstock and oxidant gain admission to the cracking chamber are in the burner face, so that they are all located in the same plane. For the purpose of supporting certain parts of the introducing means for the feedstock and fuel, a conduit member 56 is secured to the plate 55 on the extended longitudinal axis of chamber 42. The conduit 56 has an inner end of reduced cross section which fits into an opening of reduced cross section in the outer surface of plate 55, into which the conduit is fixedly secured. An opening of the same diameter as the inside of conduit 56 is cut through the burner face so as to be disposed in registry with the inside of the conduit. Disposed coaxially within the conduit 56 is a conduit 50 which terminates at the burner face, but is longer than conduit 56. Conduit 50 is a straight run of tubing of uniformly circular cross section having a length to diameter ratio on the order of about 20 to 1 which ratio may if desired be decreased slightly to less than 20 to 1 or increased to infinity. In the present embodiment, the conduit 50 is ⅞ inch in inside diameter and 20 inches long.

In the present preferred embodiment, the source 80, valve 81, controller 82 and control loop 83, which were mentioned previously, as well as the conduit 50, considered collectively, constitute the feedstock introduction means, with the conduit 50 constituting the nozzle which directs the feedstock stream into the cracking chamber. The inner surface of the walls of conduit 50 constitute a stream-forming member which as a consequence of its position, shape and dimensions, carries out the function of confining the flow of hydrocarbons (e.g. feedstock and/or products) or at least the major portion thereof, to a flow path which occupies less than about half of the transverse cross-sectional area of the cracking chamber. By "transverse cross-sectional area" is meant the area of the chamber measured in a plane perpendicular to the longitudinal axis of the chamber. The requirement for confining the hydrocarbons to this limited cross section extends throughout that portion of the chamber in which the hydrocarbons are travelling in unobstructed side-by-side relationship with the burning fuel (no intervening barrier) and are at combustion inducing temperatures. However, once the hydrocarbons have entered a zone in which they are separated from the oxidant by a physical barrier and/or have been cooled to temperatures at which combustion is no longer a substantial danger, the confining requirement no longer exists. Any other feedstock stream forming member which performs or assists in the function of confining the flow of the major portion of the feedstock to the specified cross section at least until it reaches the downstream end of the cracking zone may be added to or substituted for the conduit 50, even if the confining effect thereof is less than perfect or even somewhat crude. Thus, for instance, feedstock nozzles with drag-inducing members therein on their longitudinal axes for slowing the velocity of the center of the stream, or feedstock nozzles with other than circular cross section may be used. It is preferred, however, to use that type of nozzle which promotes the least possible mixing of the feedstock with the burning fuel and the unobstructed, 20 to 1 or greater length to diameter ratio, circular cross section tube is considered best for this purpose at the present time.

The conduit 50 is provided with a cooling jacket 51 having an interior 54 and coolant inlet 52 and outlet 53. The outer surface of the cooling jacket 51 and the inner surface of the conduit 56, respectively, define the inner and outer boundaries of an annular fuel introduction passageway 59 closed off at one end by an apertured cap 57 and gas-tight gasket 58 and the coolant circulating in interior 54 of cooling jacket 51 helps prevent sticking of the fuel particles on passageway 59. The downstream end of passageway 59 constitutes a port which opens through the burner face into cracking chamber 42 surrounding conduit 50. The term "surrounding," wherever used in the present specification and claims, means that the item described thereby, e.g. said part, encircles more than half of the way around the feedstock nozzle conduit 50. The aforesaid part preferably extends substantially all the way around the conduit 50 in the burner face, so that the feedstock stream will be enclosed substantially completely by the fuel stream. Thus, an annular opening is desirable. However, this does not rule out the provision of braces or spokes in the annular fuel opening for maintaining alignment between the conduits 50 and 56, so long as such braces or spokes are dimensioned, shaped and finished in such a manner that they do not unduly disturb the desired flow of fuel solids. Thus, braces in the form of fixed turbine blades extending between the conduits may be used to advantage both for maintaining alignment between them and for imparting a rotational component of motion to the fuel stream. It has been found however that the same result can be obtained at a lower cost of construction by wrapping the exterior of the cooling jacket 51 with the wires 61 whose diameters are substantially the same as the spacing between the jacket and conduit 50, the turns of wire being separated longitudinally to provide one or more helical passages. Thus, in this preferred embodiment in which the conduit 50 is 1″ x 16 gauge x 347 ss, the cooling jacket 51 is 1.25″ x 16 gauge x 347 ss and the conduit 56 is a 1.5″ conduit, 12⅛″ diameter wires 61 are silver soldered to the exterior surface of the cooling jacket 51 so that they are angularly spaced from one another in the annular passageway 59 at about 30° intervals and rotate through 180° about the periphery of conduit while traversing a longitudinal distance of about 3″ in said passageway. This assembly, and the blower 85, valve 87, conduit 36, solids feeder assembly of FIGS. 3 and 4, conduit 33, grinder 38, conduit 39 and tangential entry fuel inlet into passageway 59, considered collectively, consitute a preferred means for introducing solid carbonaceous fuel into the cracking chamber 42 with components of motion downstream in said chamber and divergent from the general direction of movement of the feedstock stream.

In this embodiment the centrifugal force generated by rotation of the fuel stream is the factor which induces its outward component of motion which causes its direction of movement to diverge from that of the feedstock. However, rotation-inducing fuel introducing means are not required. For instance, the wires 61 may be omitted and the open end of passageway 59 may be flared as it approaches the burner face. Various types of deflectors may be used without departing from the scope of the invention.

Spaced outwardly from passageway 59 in the walls of conduit 56 are a pair of passages 62 and 63 which have been provided to conduct a mixture of oxygen or air and fuel gas from an external source, not shown, to an annular distribution chamber whence such mixture is directed through twelve pilot lights 66 equally spaced (angularly) from one another around the longitudinal axis of conduit 50 and having their discharge outlets between the fuel introduction port and the oxidant introduction means to produce pilot flames 68.

Surrounding the passageway 59, and preferaby spaced outwardly from the pilot lights 66 is an oxidant introduction means 69 extending through the plate 55 and the burner face and communicating between the interior of manifold 70 and that of the chamber 42. The walls of manifold 70 are secured in gas-tight relationship to the top of plate 55 and the periphery of the conduit 56. The oxidant supply conduit 71 enters the manifold tangentially through inlet 72. The oxidant introduction means 69 may take various forms. For instance, it may be an annular port, or it may be a number of (e.g., twelve) passageways arranged at equally, angularly spaced intervals about the longitudinal axis of conduit 50. The oxidant introduction means should be adapted for distributing the oxidant as evenly as possible around the periphery of the chamber 42. The data set forth in the example hereinafter was obtained with a reactor in which the oxidant introducing means is twelve passageways as above described. However, there is some evidence that even better performance can be obtained with an annular port.

Regardless of its form, it is considered advantageous for the feedstock introducing means to be spaced outwardly from the feedstock conduit 50 by a substantial distance, e.g. a distance which is at least equal to the radius of the conduit 50. The feedstock introducing means can be directed either in the same direction as the feedstock conduit 50 or in a divergent direction but should not be directed in a convergent direction. Such divergence is particularly useful in embodiments of the invention in which the chamber 42 has divergent walls and the hydrocarbon stream is permitted to freely expand as it moves downstream. However, in the present embodiment, the passageways 69 are arranged with their longitudinal axes parallel to that of feedstock conduit 50 and chamber 42, so that they direct at least the major portion of the oxidant (e.g. secondary air) downstream in the chamber 42 adjacent side wall means 43. Such a mode of construction is simple and appears satisfactory. It should be understood that the oxidant inlet need not be in the form of a single annular port or single circle of spaced passageways. A plurality of such circles or ports or one or more of each in combination with the other may be provided. In any event, such annular port(s) or passageway(s), or other kinds of outlet or outlets taken together with the blower 85, valve 86, control loop 87, controller 88, conduit 71, and manifold 70, constitute an acceptable oxidant introducing means for producing an envelope of oxidant surrounding the fuel and for directing the oxidant downstream while keeping it spaced outwardly from at least the major portion of the feedstock stream.

As previously indicated, the use of a planar burner face in which the openings through which the feedstock, fuel and oxidant all gain access to cracking chamber 42 are all in the same transverse plane is a matter of convenience in construction and is by no means essential. If desired, one or more of the inlets for the fuel, feedstock and oxidant may be placed an appreciable distance downstream in the chamber. For example, a frusto-conical burner face may be employed in which the long radius end of the frusto-conical burner is situated at the upstream end of the cracking chamber, the short radius end of the burner extends downstream in the chamber, and the axis of the burner coincides with that of the chamber. In such case, the feedstock opening may be in the small circular downstream end of the frusto-conical burner member on the longitudinal axis thereof, and the fuel and oxidant inlets may be annular ports located at longitudinally spaced points in the conical surface. Such a construction is particularly useful in a reactor in which the walls of the cracking chamber diverge towards the downstream end thereof. In this connection, it should be understood therefore, that the use of the term "surrounding" to express the spatial relationship between the fuel inlet and the feedstock inlet on the one hand, and the oxidant inlet and the fuel inlet on the other, does not require that these inlets be in the same plane. Rather the term is used, as previously mentioned, to convey the idea that one inlet encircles the other, and if the requisite degree of encirclement can be seen in a transverse cross-section of the reactor looking upstream from a point immediately downstream of the inlets in question, then the requirement of "surrounding" has been met. For similar reasons, the terms "outward" and "outwardly" should not be interpreted as requiring that the things or actions designated thereby exist or take place in the same transverse plane. It should be apparent therefore that the details of construction given herein in respect to the preferred embodiment are illustrative only and many variations thereon, falling within the spirit of the invention, will occur to those skilled in the art.

In order to protect the plate 55 from the high temperatures generated within the cracking chamber 42 by the combustion of the solid fuel and oxidant, it has been found desirable to provide the plate with cooling. This has been done by providing a circular groove 73 in the upper surface of plate 55, and by covering over said groove with a circular cover plate 74 to form a leak-proof passage. Cooling fluid, e.g. water is admitted to said passage by a supply pipe 75 and departs through outlet pipe 76.

While any conventional quenching, product withdrawal and recovery system may be used with the portions of the reactor discussed thus far, we prefer to use the eductor tube shown in FIGS. 5A and 5B and the recovery system shown in FIG. 7. In the preferred embodiment disclosed herein, the eductor tube 44 is stationed on the longitudinal axis of cracking chamber 42 with its inlet port 105 directed towards feedstock conduit 50. In reactors of differing configuration, it might be necessary to locate the eductor in reference to some point other than the cracking chamber axis in order to intercept the highest concentration of cracked products, but with the reactor shown herein the axial location is preferred. The eductor may be supported in any convenient manner either fixed or moveable, and may be attached to any convenient part of the reactor. However, in the reactor shown herein, it is preferred that the eductor be supported in the bottom wall of the combustion product collection chamber 47.

The chamber 47 comprises top wall 95, side walls 96, and bottom wall 97 in which is disposed a stuffing box 98 centered about the extended axis of chamber 42 and in registry with passages 104 and 103 formed in the upper and lower walls, respectively, of chamber 47. Passage 103 is of slightly larger diameter than the outside of eductor tube, while passage 104 is of slightly larger diameter than the inside of the cracking chamber. The eductor tube extends from outside the chamber 47, through stuffing box 98, through passage 103, through chamber 47 and through passage 104 into cracking chamber 42. The stuffing box includes packing 99 and a packing nut 100 for compressing the packing against the sides of eductor tube 44 and against the outer end of passage 103. With the nut loosened, the eductor tube may be extended or retracted axially to place its port 105 at any desired distance from the end of feedstock conduit 50. The nut 100 may then be tightened to immobilize the eductor tube in the desired position.

Because of the very high temperatures required in the cracking chamber, and the fact that the eductor will ordinarily be made of steel instead of refractory material, some sort of internal cooling is usually required. This may be accomplished by building the tube of inner 101 and outer 102 concentric conduits forming an annular coolant passage 106 within the body of the eductor. The passageway 106 should transverse at least that portion of the length of the eductor which is extendible into the cracking chamber 42, and preferably transverses, as shown in FIGS. 5A and 5B, so much of the tube as is extendible into the reactor, including not only chamber 42, but chamber 47 as well. The coolant passage is preferably closed off at both its inner 107 and outer 108 ends, and the inner tube 101 extends beyond the outer end of said passage for connection with any suitable product recovery system, such as that shown in FIG. 7. Coolant, such as a gas or liquid, e.g. water, may gain entry to coolant passage 106 through a fresh coolant delivery conduit 109 communicating with said passage from outside the reactor.

In accordance with the invention, the eductor may be provided with any convenient form of used coolant outlet at any convenient location. However, it is preferred that the used coolant outlet should be situated in a portion of the eductor which is within the reactor, where it may be used for quenching the cracked products. In its most preferred form the coolant outlet means comprises a plurality of outlets 110 communicating between coolant passageway 106 and the interior of conduit 101 adjacent inlet port 105. Thus disposed, the waste coolant outlets may be used to direct coolant into the cracked products as they enter the eductor through port 105, thus quenching them. Without any intention of being bound thereby, the following dimensions are set forth as constituting preferred dimensions for the eductor: outer tube 102, 1.50" x 16 gauge x 347 ss; inner tube 101, 125" x 16 gauge x 347 ss; and waste coolant outlets 110, 24 in number, .02" in diameter, equally spaced in groups of 8 about 3 circles, 1/16", 1/8" and 3/16", respectively from the inner end 107 of the eductor. Those skilled in the art will recognize that these dimensions may be readily varied to suit various reactors and operating conditions.

Because the outer transverse dimensions (e.g. diameter) of the eductor assembly are substantially less than the transverse dimensions (e.g. diameter) of the inside of the cracking chamber, an annular passageway 45 of appreciable width is provided therebetween. This passageway is provided for hot products of combustion to depart the reactor and may be provided with an injector to burn any coal which reaches this point without having burned. It should be apparent that the eductor tube may be used in cracking reactors in which other than solid carbonaceous fuel is used. However, in the present embodiment, the passageway 45 will conduct both gaseous and solid (ash) products of combustion. Passageway 45 communicates through passageway 104, with chamber 47, where the gaseous combustion products may be drawn off through outlet 111 and any solids which collect therein can be periodically removed through a scuttle 112.

As shown in FIG. 7, the conduit 101, through which the quenched cracked products depart the eductor and the reactor, is connected to a quench fluid separator 123 having a fluid outlet 124 and a cracked products outlet conduit 125. Conduit 125 communicates with a gas/solids separator system 126 (e.g. agglomerator and bag filter) which is used whenever solid cracked products (e.g. carbon black) are being produced. The gas/solids separator system outlet 127 discharges into a conduit 128. When no solids are being produced, the gas/solids separation system may be by-passed and the quench-fluid-free products may be passed directly to conduit 128 by opening by-pass valve 129. A pneumatically-actuated motor valve 130 and differential pressure transmitter/controller 131 are located in conduit 128, the controller 131 being interconnected with the motor in valve 130 through a feedback loop 132. Between the controller and valve is a vacuum gauge 133 for visual reading of the vacuum in conduit 128. On the downstream side of the controller 131, conduit 128 connects to the suction side 122 of a steam ejector 120, an aspirator type device which uses steam from a supply conduit 121 to pull a vacuum on the conduit and on the eductor upstream through the quench water separator 123, gas/solids separator 126 or by-pass valve 129, motor valve 130 and controller 131. Steam and gaseous cracked products depart the ejector through outlet 134 into condenser 119 which converts the steam vapors to entrained liquid. The entrained liquid and cracked products depart condenser 119 into condensate separator 118 which delivers condensate through a condensate outlet 117 and substantially liquid free cracked gaseous products through a product outlet 116. Outlet 116 may be connected to any suitable product purification or recovery device of which a wide variety are known to persons skilled in the art. Accordingly, no description of such devices will be given herein.

The differential pressure controller/transmitter is of a type having a preselective variable set-point, so that it can open and close motor valve 130 to maintain any selected vacuum in conduit 128, and in conduit 101. Since the pressure in cracking chamber 42 is also controlled, by controlling the rates of flow of feedstock, fuel and oxidant and the rate of combustion, the ejector 120, controller 131, control loop 132, and valve 130, considered collectively, constitute an acceptable means for producing a controlled negative pressure differential between the interiors of the cracking chamber and eductor.

The use of the eductor tube and associated means for producing the aforesaid pressure differential contribute certain operating efficiencies to the cracking processes. For instance, the products are diluted to a much lesser extent with combustion gases than in the case of the usual precombustion, partial combustion and other pyrolytic cracking processes. This reduces the size and cost of the recovery system needed to handle the cracked products. It also considerably reduces the extent of purification needed to put the product in a saleable or usable form. The use of the eductor avoids the necessity of quenching all of the hot combustion gases in the reactor to cool the products, so the heating value available from the waste combustion gases is available for recovery at a high level of thermal efficiency instead of being wasted. The movable feature of the eductor tube facilitates process control, in that it makes possible quick adjustment of the residence time of the feed and products without the necessity of altering the rates of introduction of fuel, oxidant and feedstock into the reactor. It has been found possible to extend and retract the eductor tube over substantial distances within the cracking chamber without adversely affecting reactor operation.

EXAMPLE

This examples illustrates the operation of the process and apparatus described above:

Process conditions
Feed: Propane
Propane temperature: 1100° F.
Propane rate: 63.5 pounds per hour
Fuel: #2 Gas Seam Coal from Boone County, W. Va., supplied by Obelbay Norton
    B.t.u. content (moist. & ash free basis): per pound 14,500
    Ash content: 7%
    $H_2$ content: 7%
    Volatile content: 33%
    Ash fusion temp.: 2800° F.+
    S content: 0.8%
    Fixed C: 60%
    FSI: 5
    Percent passing 325 mesh sieve: 60%
    Moisture content: 2%
Fuel rate: 31 pounds per hour
Oxidant: Air
Air temperature: 1100° F.
Air rate: 5800 s.c.f.h.
    Percent air introduced as secondary air: 90% (approx.)
    Percent of air introduced as primary air for suspending coal: 10% (approx.)
Distance of eductor from burner face: 4.5 inches
Quench fluid: Water
Water temperature at inlet to eductor: 80° F.
Water rate: 3.5 g.p.h.
Pressure in reactor: 1 lb. p.s.i.g.
Refractory temperature: 3000° F.
Residence time of hydrocarbons in cracking chamber: 1 millisecond (approx.)
Quenched products temperature: 150° F.
Flow rate of quenched products stream: 850 s.c.f.h.

The flame exhibits good stability and has an intense orange to white color. No supplementary fuel gas is used after start-up, except for the negligible amount of fuel gas consumed by the pilot lights. The gas from the eductor and from the annular passage surrounding it are sampled under steady state conditions and are analyzed. The results of the analysis are set forth as follows:

| Component | Volume (percent) | |
|---|---|---|
| | In eductor | In annular passage |
| $H_2$ | 9.8 | 13.3 |
| $O_2$ | 0.2 | 0.1 |
| $N_2$ | 71.6 | 66.4 |
| CO | 11.0 | 10.2 |
| $CO_2$ | 5.2 | 4.2 |
| $CH_4$ | 0.2 | 1.8 |
| $C_2^=$ | 0.4 | 1.0 |
| $C_2^-$ | 1.5 | 3.0 |

The carbon balance is then calculated with the following results:

In

| Item: | Pounds per hour |
|---|---|
| As propane | 52 |
| As coal | 23.5 |
| Total | 75.5 |

Out

| | |
|---|---|
| As $C_2H_2$ | 10.4 |
| As $C_2H_4$ | 4.4 |
| As $C_3$'s | 0.1 |
| As $CH_4$ | 3.0 |
| As $CO_2$ | 7.9 |
| As CO | 18.8 |
| As carbon black | 14.0 |
| Total | 58.6 |

Unaccounted for

| | |
|---|---|
| (Unburned carbon in coal) | 16.9 |

In conclusion, while the foregoing specification and drawings describe the construction, operation and use of certain preferred embodiments of the instant invention, it is to be understood that there is no intention to limit the invention to the precise constructions and arrangements herein disclosed, since the various details of construction, form and arrangement may obviously be varied to a considerable extent by any person skilled in the art without really departing from the basic principles and novel teachings of this invention and without sacrificing any of the advantages thereof. Accordingly, the appended claims are intended to encompass all changes, variations, modifications and equivalents falling within the scope of the invention.

What is claimed is:

1. A hydrocarbon cracking process comprising supplying a hydrocarbon feed stock stream, a flow of finely divided, particulate, solid, combustible carbonaceous fuel and oxidant to a confined cracking zone, said fuel being introduced into said zone as at least one stream which is separate from the major portion of the oxidant and which intervenes between said oxidant and said feed stock stream; burning said flow in said zone; conducting said hydrocarbon feed stock stream through said cracking zone adjacent to and concurrently with but substantially separate from said burning flow of oxidant and carbonaceous fuel; retaining said feed stock stream in the presence of but substantially separate from said burning flow for a time and at a temperature sufficient to crack said feed stock; and recovering the resultant cracked products.

2. The process of claim 1 conducted in the substantial absence of steam.

3. The process of claim 1 conducted in the substantial absence of hydrocarbon fuel.

4. An improved cracking process comprising flowing a hydrocarbon feed stock downstream in a cracking zone and cracking said feed stock therein by subjecting it to heat transferred thereto by combustion of a concurrently flowing stream of solid, particulate carbonaceous fuel with an oxidant, said fuel being introduced into said cracking zone in intervening relationship between said feed stock and the major portion of the oxidant, and thereafter withdrawing first and second separate streams from said cracking zone, the first of said streams having a higher concentration of cracked products than said second stream.

5. The process of claim 1 wherein said feedstock stream and the burning flow of solid carbonaceous fuel flow through said zone as generally concentric streams.

6. Process according to claim 5 wherein said feedstock stream is surrounded by said burning flow.

7. Process according to claim 5 wherein said feedstock, said fuel and the major portion of the oxidant are each introduced into said zone separately from the other, moving in the same general direction, with said feed stream being surrounded by the fuel and said fuel being surrounded by the major portion of said oxidant.

8. Process according to claim 7 wherein a minor portion of the oxidant is mixed with said carbonaceous solid fuel as a suspending medium prior to their introduction into said zone.

9. Process according to claim 7 wherein said fuel stream is introduced with a component of motion downstream in said zone and with a component of motion away from said feedstock and toward the major portion of the oxidant.

10. Process according to claim 9 wherein said fuel stream is rotated to provide said component of motion away from said feedstock.

11. Process according to claim 1 wherein the rate of combustion of said carbonaceous solid fuel is controlled by adjustment of the particle size thereof.

12. Process according to claim 1 wherein the rate of combustion of said carbonaceous solid fuel is controlled for sustaining the combustion of said particles substantially throughout the length of the cracking zone and for completing the combustion of said particles substantially at the downstream end of said cracking zone, whereby the hot, high emissivity, incandescent, burning carbonaceous fuel particles radiate heat into the feedstock substantially throughout the entire length of the cracking zone, thus continually adding heat to the reaction mass by radiant heat transfer to make up for heat abstracted therefrom by the endothermic cracking reaction.

13. Process according to claim 1 wherein a stream rich in the resultant cracked products is isolated within said cracking zone from the major portion of the resultant combustion products and is removed from said chamber as a separate stream.

14. Process in accordance with claim 1 wherein said hydrocarbon feedstock is a fluidic feedstock selected from the group consisting of aliphatic and alicyclic hydrocarbons.

15. Process according to claim 1 wherein said feedstock is fed in a gaseous state.

16. Process according to claim 1 wherein said hydrocarbon feedstock includes a major weight proportion of aliphatic saturated hydrocarbon(s).

17. Process according to claim 16 wherein said hydrocarbon(s) have an average of at least two carbon atoms per molecule.

18. Process according to claim 1 wherein said carbonaceous fuel has a maximum particle size of substantially sixty mesh.

19. Process according to claim 1 wherein said carbonaceous fuel is characterized by a hydrogen content of less than about 15 percent.

20. Process according to claim 1 wherein said carbonaceous fuel is a member selected from the group consisting of ground coal, devolatilized coal, coal char obtained from low temperature carbonization of coal, and mixtures thereof.

21. Process according to claim 1 wherein said solid carbonaceous fuel is characterized by an ash fusion point of at least about 3000° F.

22. Process according to claim 1 wherein at least about 80% of the heat generated in said cracking zone is generated by the combustion of said solid carbonaceous fuel.

23. Process according to claim 1 wherein said oxidant is a free-oxygen containing gas.

24. Process according to claim 23 wherein said gas is air.

25. Process according to claim 1 wherein said feedstock is a fluidic hydrocarbon feedstock containing from about 2 to 10 carbon atoms per molecule, said feedstock being retained in said cracking zone at a temperature of about 1500° F. to about 3500° F. for a residence time in the range of about $10^{-1}$ to about $10^{-4}$ seconds for converting said hydrocarbon feedstock to a product mixture comprising acetylene and ethylene.

26. Process in accordance with claim 25 wherein said temperature is in the range of about 2000° F. to about 3200° F.

27. Process in accordance with claim 1 wherein the rate of heat release from combustion of said carbonaceous fuel is maintained substantially equal to the rate of heat consumption from cracking of said hydrocarbon feedstock and from normal losses for maintaining said streams at substantially stable temperatures by energy exchange therebetween during their passage through said zone.

28. Process according to claim 1 wherein said solid carbonaceous fuel is burned in the form of a long, stable flame extending substantially throughout the length of the cracking zone.

29. Process in accordance with claim 13 wherein the temperature of the cracked products in said isolated stream is rapidly reduced to a temperature of not more than 800° F. at the downstream end of the cracking zone.

30. Process in accordance with claim 29 wherein the temperature of the cracked products in said isolated stream is rapidly reduced to not more than about 500° F. in the quenching operation.

31. Process of claim 1 conducted at atmospheric pressure.

32. Process according to claim 1 wherein heat is transferred from said burning flow to said feedstock in said zone for cracking said feedstock without any structural member intervening therebetween and, subsequent to the cracking of said feedstock, the resultant cracked products are isolated from said combustion products by a structural barrier and quenched out of the presence of said combustion products.

33. An improved cracking process comprising the combined steps of: continuously feeding a gaseous hydrocarbon cracking stock, a finely divided, combustible, particulate solid carbonaceous fuel, and a gaseous oxidant into and through a confined cracking zone; in said zone, burning said carbonaceous fuel substantially separate from but in sufficiently near proximity to said hydrocarbon feedstock, to provide the heat necessary for cracking said feedstock in said cracking zone to cracked products; said feedstock being fed into said cracking zone in the form of at least one stream separate from said carbonaceous fuel and oxidant; said solid fuel and the major portion of said oxidant being maintained separate from one another until entering said cracking zone and being ignited therein; said carbonaceous fuel being introduced in a substantially intervening relationship between said feedstock and said major portion of said oxidant for discouraging combustion of said feedstock; controlling the rate of combustion of said carbonaceous solid fuel products for sustaining the combustion of said particles substantially throughout the length of said cracking zone, whereby the hot, high emissivity, incandescent, burning carbonaceous fuel particles radiate heat into said feedstock substantially throughout the entire length of said cracking zone, thus continually adding heat to said feedstock to make up for heat abstracted by the endothermic cracking reaction and normal heat losses.

34. Process according to claim 33 wherein said process is conducted with said carbonaceous fuel being used substantially exclusively as the heat generating medium for said cracking reaction.

35. Process according to claim 33 wherein said process is conducted in the substantial absence of water vapor, including steam.

36. Process in accordance with claim 33 wherein said cracked products and said combustion products are isolated from one another prior to quenching of the cracked products.

37. A cracking process comprising introducing a flow of oxidant into a cracking chamber establishing a quantity-controlled flow of combustible solid particulate carbonaceous fuel, scattering said flow of fuel in a stream of gaseous suspending medium, sending the resultant solid carbonaceous fuel suspension to said cracking chamber, introducing said suspension into said cracking chamber in the form of at least one stream concentric with an inner stream of hydrocarbon feedstock moving in the same general direction, said solid carbonaceous fuel suspension intervening between said feedstock and at least the major portion of the oxidant and having a component of motion in the same general direction as said feedstock and another component of motion away from said feedstock, igniting said solid fuel suspension in said cracking chamber, cracking said feedstock through the action of the heat provided by combustion of said solid carbonaceous fuel; and recovering the cracked products separate from said combustion products.

References Cited

UNITED STATES PATENTS

| | | | |
|---|---|---|---|
| 1,892,559 | 12/1932 | Hillhouse | 260—679 |
| 2,413,407 | 12/1946 | Dreyfus | 260—683 |
| 2,498,444 | 2/1950 | Orr | 260—683 |
| 2,707,148 | 4/1955 | Kollgaard | 208—126 |
| 2,767,233 | 10/1956 | Mullen | 260—683 |
| 2,790,838 | 4/1957 | Schrader | 260—683 |
| 2,805,131 | 9/1957 | McIntire | 260—679 |

PAUL M. COUGHLAN, Jr., Primary Examiner

C. E. SPRESSER, Jr., Assistant Examiner

U.S. Cl. X.R.

260—679; 208—126